US008651470B2

(12) United States Patent
Gao

(10) Patent No.: US 8,651,470 B2
(45) Date of Patent: Feb. 18, 2014

(54) CLAMPING MECHANISM

(75) Inventor: Dong-Wei Gao, Shenzhen (CN)

(73) Assignees: Hong Fu Jin Precision Industry (ShenZhen) Co., LTD, Shenzhen (CN); Hon Hai Precision Industry Co., LTD, New Taipei (TW)

( * ) Notice: Subject to any disclaimer, the term of this patent is extended or adjusted under 35 U.S.C. 154(b) by 701 days.

(21) Appl. No.: 12/910,990

(22) Filed: Oct. 25, 2010

(65) Prior Publication Data

US 2011/0156329 A1 Jun. 30, 2011

(30) Foreign Application Priority Data

Dec. 24, 2009 (CN) .......................... 2009 1 0312177

(51) Int. Cl.
*B23Q 3/00* (2006.01)
(52) U.S. Cl.
USPC ................. 269/19; 269/43; 269/104
(58) Field of Classification Search
USPC .............. 369/19, 43, 45, 71, 75, 246, 63, 268
See application file for complete search history.

(56) References Cited

U.S. PATENT DOCUMENTS

| 6,138,372 | A * | 10/2000 | Newman .......................... 33/638 |
| 6,427,993 | B1 * | 8/2002 | Prochac ........................... 269/37 |
| 6,775,917 | B1 | 8/2004 | Campbell |
| 7,530,557 | B2 * | 5/2009 | Bui et al. ......................... 269/63 |
| 8,454,004 | B1 * | 6/2013 | Warth ............................ 269/244 |
| 2011/0156329 | A1 * | 6/2011 | Gao ................................ 269/19 |

FOREIGN PATENT DOCUMENTS

CN 2071563 U 2/1991

* cited by examiner

*Primary Examiner* — Lee D Wilson
(74) *Attorney, Agent, or Firm* — Altis Law Group, Inc.

(57) ABSTRACT

A clamp mechanism for a workpiece having an oblique surface is provided. The clamp mechanism includes a base, a fixing member, and a locking assembly. The base includes a main body, a pivot shaft, and two holding portions on the main body which are away from the pivot shaft, and each holding portion defines a curved sliding slit extending around the pivot shaft. The locking assembly includes a locking member and an engaging member engaging with the locking member. The locking member passes through and slides along the sliding slits of the holding portions of the base. One end of the fixing member is rotatably connected to the base, and the locking member passes through the other end of the fixing member.

15 Claims, 5 Drawing Sheets

CLAMPING MECHANISM

BACKGROUND

1. Technical Field

The present disclosure generally relates to clamp mechanisms, and more particularly to a clamp mechanism for a workpiece having an oblique surface.

2. Description of Related Art

During manufacturing, machining apparatuses such as grinding and milling machines generally machine a plurality of workpieces in a horizontal position, however, many workpieces have oblique surfaces which are difficult to clamp at a plurality of predetermined positions for being machined.

A frequently used clamp mechanism includes a base and a fixing member, and the base has an oblique surface on which the fixing member fixes the workpiece, while the other side of the workpiece is held in a horizontal position for being machined.

However, the oblique surface of the base is unchangeable, and being capable of merely clamping the workpieces having oblique surfaces with a certain particular oblique angle. As a consequence, multiple clamp mechanisms are required for the workpieces having oblique surfaces with different oblique angles, and the machining cost is thereby increased.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
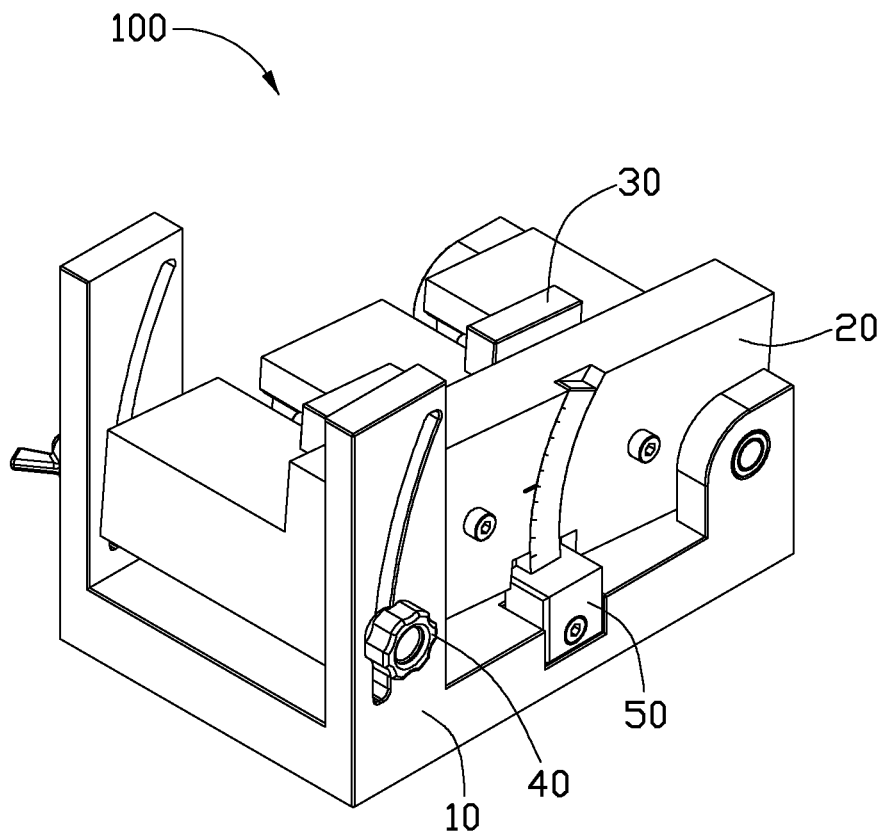
FIG. 1 is an assembled, isometric view of one embodiment of a clamp mechanism.
Figure 2:
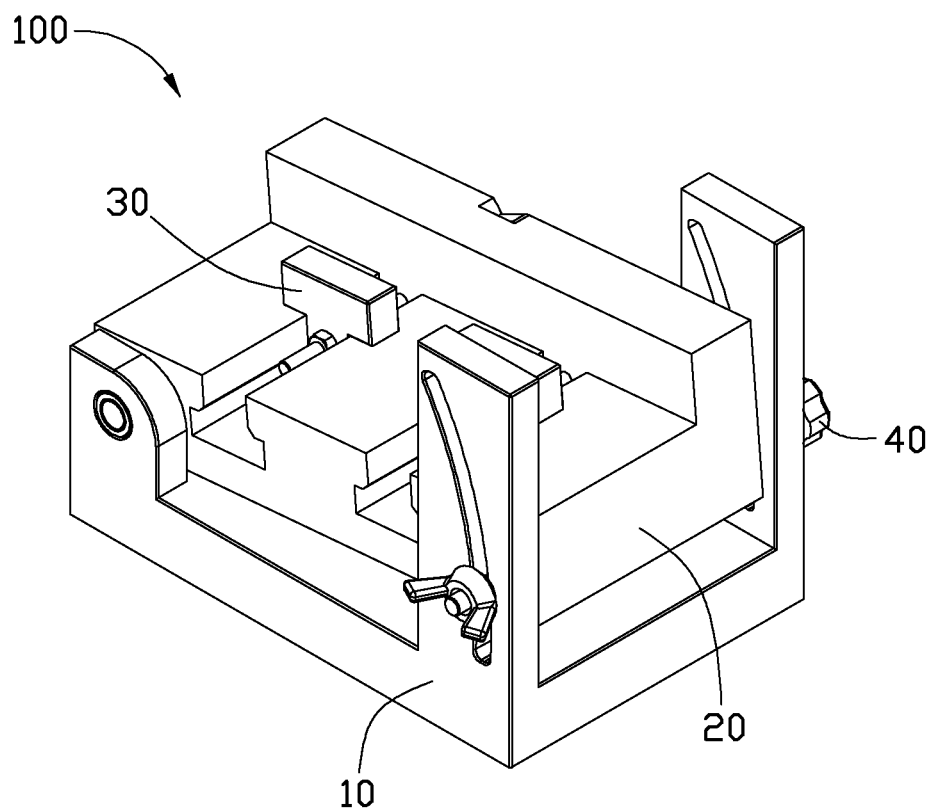
FIG. 2 is similar to FIG. 1, but viewed from another aspect.

Referring to FIGS. 1 and 2, one embodiment of a clamp mechanism 100 includes a base 10, a fixing member 20 positioned on the base 10, two latching assemblies 30 received in the fixing member 20, and a locking assembly 40 and a measurement assembly 50 mounted on the base 10 and the fixing member 20.

Figure 3:
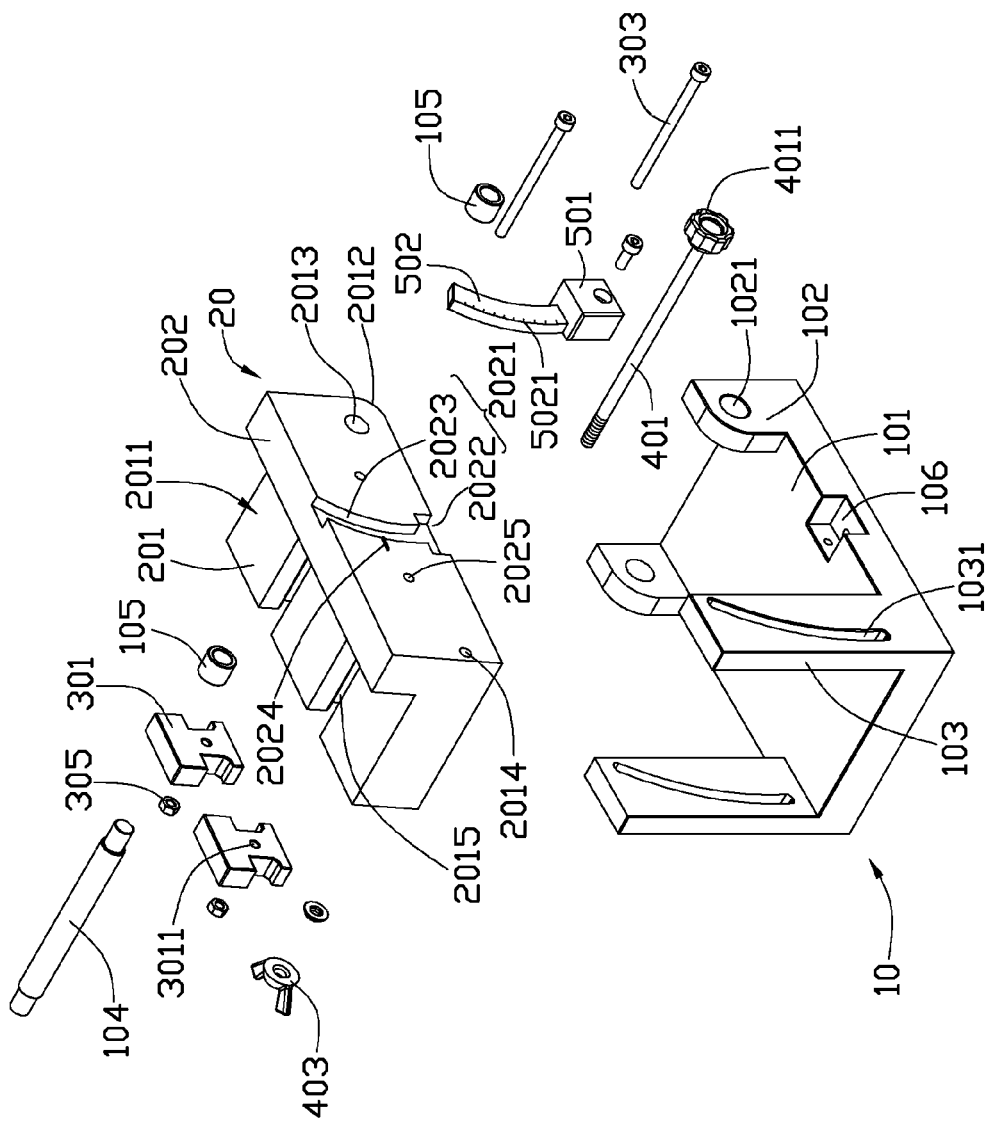
FIG. 3 is an exploded, isometric view of the clamp mechanism of FIG. 1.
Figure 4:
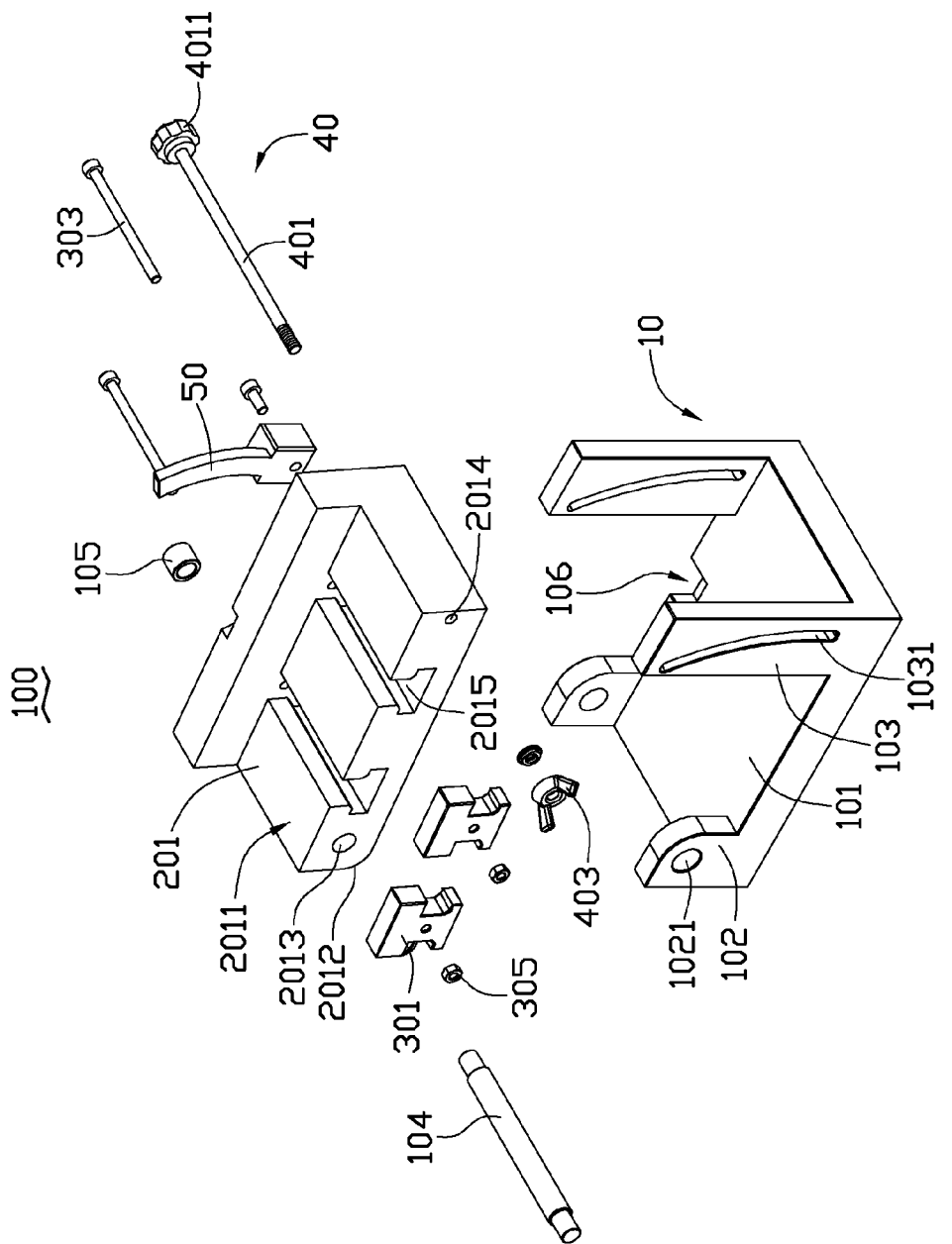
FIG. 4 is similar to FIG. 3, but viewed from another aspect.

Also referring to FIGS. 3 and 4, the base 10 includes a main body 101, a pair of rotary portions 102, a pair of holding portions 103, a pivot shaft 104, and a pair of sleeves 105. The main body 101 is substantially a plate, and defines a recess 106. The rotary portions 102 are formed on opposite sides of one end of the base 101, and the holding portions 103 are formed on opposite sides of the other end of the base 101 and away from the rotary portions 102 and the pivot shaft 104. Each rotary portion 102 defines a pivot hole 1021 through which the pivot shaft 104 passes and the sleeves 105 are received. Each holding portion 103 defines a curved sliding slit 1031 extending around the shaft hole 1021 of the rotary portions 102. In the illustrated embodiment, the rotary portions 102 and the holding portions 103 are substantially perpendicular to the main body 101. Alternatively, the base 10 may include one rotary portion 102 and one holding portion 103. The holding portions 103 may even be omitted altogether, and the pivot shaft 104 snugly received in the rotary portions 102, such that the pivot shaft 104 is capable of rotating through many angles and maintaining any position.

The fixing member 20 includes a support portion 201 and a resisting portion 202 connecting with one end of the support portion 201.

The support portion 201 is substantially a plate which has a support surface 2011, and the support portion 201 forms a rounded corner 2012. The support portion 201 further defines a pivot hole 2013, a through hole 2014, and two receiving spaces 2015. The rounded corner 2012 is adjacent to and homocentric with the pivot hole 2013. The pivot hole 2013 and the through hole 2014 extend through both the support portion 201 and the resisting portion 202, and are away from each other. The receiving spaces 2015 recess from the support surface 2011, and are substantially parallel to each other.

The resisting portion 202 is substantially a plate. The resisting portion 202 defines a receiving groove 2021, and the receiving groove 2021 includes a recess 2022 and a guide slit 2023 communicating with the recess 2022. The resisting portion 202 forms an index line 2024 at adjacent to the guide slit 2023 and defines two securing holes 2025 communicating with the receiving spaces 2015 of the support portion 201. The guide slit 2023 is curved.

In the illustrated embodiment, the resisting portion 202 is substantially perpendicular to the support portion 201, and the receiving spaces 2015 form an inverted T, respectively. Alternatively, the support portion 201 may define one or more than two receiving spaces 2015, with the number of securing holes 2025 of the resisting portion 202 modified to one or more than two correspondingly.

Each latching assembly 30 includes a latching member 301, a securing member 303 passing through the latching member 301, and a fastener 305 engaging with the securing member 303. The latching member 301 defines a receiving hole 3011. In the illustrated embodiment, the latching member 301 defines two notches (not labeled) at opposite sides thereof, and the securing member 303 and the fastener 305 are a threaded bar and a threaded nut, respectively. Alternatively, the latching member 301 may define one notch at one side and the receiving spaces 2015 being substantially L shaped correspondingly, or define more than one notch at each side and the shape of the receiving spaces 2015 may be modified correspondingly. The clamp mechanism 100 may include one or more than two latching assemblies 30.

The locking assembly 40 includes a locking member 401, and an engaging member 403 engaging with the locking member 401. The locking member 401 has a head portion 4011 at one end thereof. In the illustrated embodiment, the locking member 401 has a threaded portion (not labeled) at an end away from the head portion 4011, and the engaging member 403 is a threaded nut engaging with the threaded portion of the locking member 401. Alternatively, the engaging member 403 may be a sleeve tightly sleeved on the locking member 401, and the threaded portion of the locking member 401 can be omitted correspondingly.

The measurement assembly 50 includes a sustaining portion 501 and a graduated scale 502 having one end connected to the sustaining portion 501. The graduated scale 502 is curved and has multiple graduation lines thereon. In the illustrated embodiment, the sustaining portion 501 is substantially rectangular, and may be globular or irregularly shaped instead.

During assembly of the clamp mechanism 100, the sleeves 105 of the base 10 are sleeved on opposite ends of the pivot shaft 104, and the pivot shaft 104 passes through the shaft hole 1021 of one rotary portion 102 of the base 10, the pivot hole 2013 of the fixing member 20, and the shaft hole 1021 of the other rotary portion 102. The locking member 401 passes through the sliding slit 1031 of one holding portion 103, the through hole 2014 of the fixing member 20, and the sliding slit 1031 of the other holding portion 103. The head portion 4011 contacts one of the holding portion 103, and the engaging member 403 engages or locks with the distal end of the locking member 401. The latching members 301 are partially received in the receiving spaces 2015 of the fixing member 20, and the securing members 303 pass through the securing holes 2025 and the receiving holes 3011 of the latching members 301, and engage with the fasteners 305. The sustaining portion 501 of the measurement assembly 50 is received in a space (not labeled) cooperatively formed by the recess 2022 of the fixing member 20 and the recess 106 of the main body 101 of the base 10, and the graduated scale 502 is received in the guide slit 2023 of the fixing member 20. The sustaining portion 501 is fixed to the main body 101 of the base 10 by a fastener (not labeled).

Figure 5:
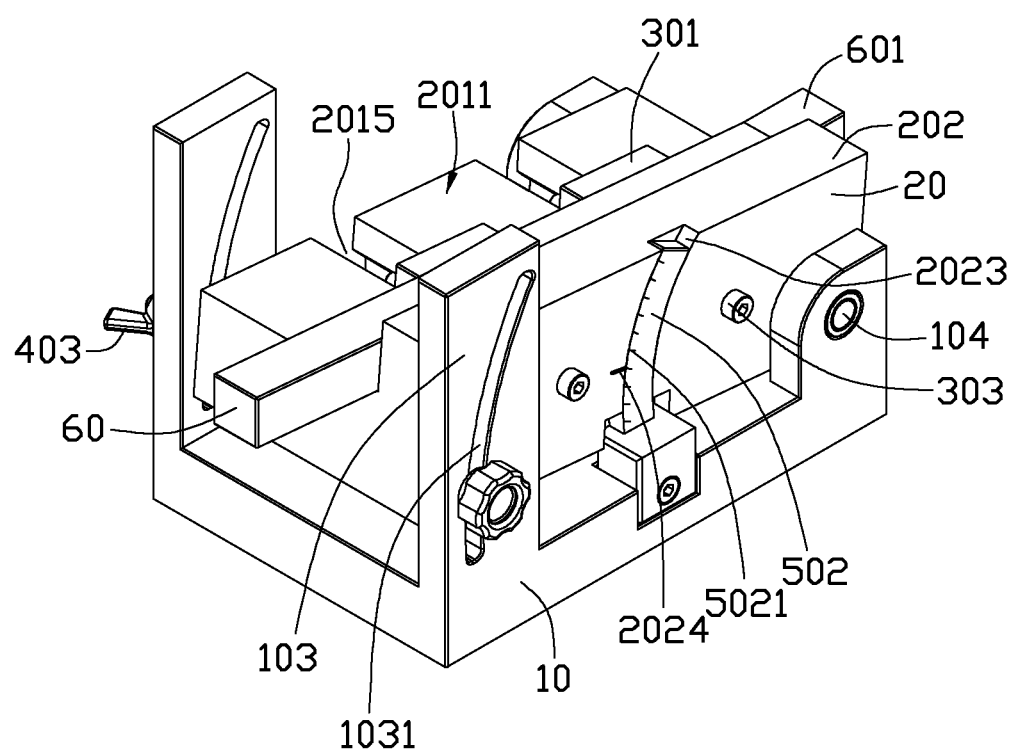
FIG. 5 is an assembled, isometric view of the clamp mechanism of FIG. 1 clamping a workpiece.

Also referring to FIG. 5, in use, a workpiece 60 having an oblique surface 601 is assembled on the fixing member 20, and the side of the workpiece 60 opposite to the oblique surface 601 contacts the support surface 2011 of the support portion 201. The latching members 301 are slid to resist the workpiece 60, and fastened by the engagement of the fasteners 305 and the securing members 303, such that the workpiece 60 is securely held on the fixing member 20.

During the adjustment of the oblique angle of the workpiece 60, the fixing member 20 is rotated around the pivot shaft 104 of the base 10, and the locking member 401 slides along the sliding slits 1031 of the holding portions 103, the graduated scale 502 slides relative to the guide slit 2023 of the fixing member 20. If the workpiece 60 is adjusted to the predetermined angle, the engaging member 403 of the locking assembly 40 is fastened, such that the fixing member 20 is securely held at the predetermined angle by the holding portions 103 of the base 10. The oblique angle of the fixing member 20 is adjusted to the predetermined angle according to the cooperation of the index line 2024 on the resisting portion 202 and the graduation lines on the graduated scale 502.

The clamp mechanism 100 is capable of adjusting the workpiece 60 to different oblique angles, or adjusting different workpieces 60 to various predetermined oblique angles. Therefore, the clamp mechanism 100 is highly universal. In addition, less clamp mechanisms are required to meet different demands, such that the manufacturing cost is reduced.

The rounded corner 2012 of the support portion 201 of the fixing member 20 is capable of preventing the fixing member 20 from being blocked by the main body 101 of the base 10 during the rotating around the pivot shaft 104. Alternatively, the support portion 201 may not have defined any rounded corner 2012, and the height of the rotary portions 102 need to be increased such that a distance between the shaft holes 1021 and the main body 101 is increased.

Alternatively, the receiving spaces 2015 may be omitted, and instead, the support portion 201 of the fixing member 20 forms two sliding rails protruding from the support surface 2011, and each latching member 301 defines a sliding groove for receiving the sliding rails.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A clamp mechanism for clamping a workpiece having an oblique surface, the clamp mechanism comprising:
a base comprising a main body, a pivot shaft, and at least one holding portion on the main body and away from the pivot shaft, the holding portion defining a curved sliding slit extending around the pivot shaft;
a fixing member having one end thereof rotatably connected to the base, the fixing member comprising a support portion and a resisting portion substantially perpendicular to the support portion;
at least one latching assembly received in the fixing member; and
a locking assembly comprising a locking member passing through and sliding along the sliding slit of the at least one holding portion of the base, and an engaging member engaging with the locking member, wherein the support portion comprises a support surface and defines at least one receiving space recessing from the support surface, and the at least one latching assembly is partially received in the at least one receiving space, the fixing member defines a pivot hole and forms a rounded corner adjacent to and homocentric with the pivot hole, and the locking member passes through the pivot hole.

2. The clamp mechanism of claim 1, wherein the at least one latching assembly comprises a latching member, a securing member, and a fastener, and the latching member is slidably engaged with the fixing member and is held by the securing member and the fastener.

3. The clamp mechanism of claim 1, further comprising a measurement assembly, wherein the measurement assembly comprises a graduated scale having a plurality of graduation lines, and the resisting portion of the fixing member defines a guide slit receiving the graduated scale.

4. The clamp mechanism of claim 3, wherein the resisting portion further forms an index line at adjacent to the guide slit.

5. The clamp mechanism of claim 3, wherein the main body of the base defines a recess communicating with the guide slit of the fixing member through a recess of the fixing member.

6. The clamp mechanism of claim 1, wherein the fixing member defines a through hole, and the locking member of the locking assembly passes through the through hole and a distal end of the locking member engages with the engaging member.

7. The clamp mechanism of claim 1, wherein the base comprises at least one rotary portion for the pivot shaft passing through, and the at least one rotary portion is away from the at least one holding portion.

8. A clamp mechanism for clamping a workpiece having an oblique surface, the clamp mechanism comprising:
a base comprising at least one rotary portion, and a pivot shaft rotatably connected to the at least one rotary portion;
a fixing member having one end thereof rotatably connected to the at least one rotary portion of the base by the pivot shaft, the fixing member comprising a support portion and a resisting portion substantially perpendicular to the support portion, the support portion forming a support surface for contacting with the workpiece and defining at least one receiving space recessing from the support surface;
a locking assembly comprising a locking member passing through the fixing member and an engaging member, wherein the at least one latching assembly is partially received in the at least one receiving space, the fixing member defines a pivot hole and forms a rounded corner adjacent to and homocentric with the pivot hole, and the locking assembly is to hold the fixing member at one or more predetermined positions relative to the base.

9. The clamp mechanism of claim 8, wherein the base further comprises at least one holding portion defining a curved sliding slit, and the locking member passes through the other end of the fixing member away from at least one rotary portion, and the locking member slides along the sliding slit.

10. The clamp mechanism of claim 8, further comprising at least one latching assembly comprising a latching member, a securing member, and a fastener, wherein the latching member is slidably engaged with the support portion to change a distance between the latching member and the resisting portion by the securing member and the fastener.

11. The clamp mechanism of claim 10, wherein the support portion defines at least one receiving space partially receiving the at least one latching member.

12. The clamp mechanism of claim 9, further comprising a graduated scale having a plurality of graduation lines, wherein the resisting portion of the fixing member defines a guide slit receiving the graduated scale.

13. The clamp mechanism of claim 12, wherein the resisting portion further forms an index line adjacent to the guide slit.

14. The clamp mechanism of claim 12, wherein the main body of the base defines a recess communicating with the guide slit of the fixing member through a recess of the fixing member.

15. The clamp mechanism of claim 8, wherein the fixing member defines a through hole, and the locking member of the locking assembly passes through the through hole and a distal end of the locking member locks with the engaging member.

* * * * *